United States Patent
Cai et al.

(10) Patent No.: US 9,920,471 B2
(45) Date of Patent: Mar. 20, 2018

(54) PROCESS OF MANUFACTURING RAIN WATERPROOF BREATHABLE FABRIC

(71) Applicants: Qiu-Xiong Cai, Taoyuan (TW);
Feng-Ying Tian, Taoyuan (TW);
Jia-Yong Xie, Taoyuan (TW)

(72) Inventors: Qiu-Xiong Cai, Taoyuan (TW);
Feng-Ying Tian, Taoyuan (TW);
Jia-Yong Xie, Taoyuan (TW)

(73) Assignee: G-Fun Industrial Corporation, Taoyuan (TW)

( * ) Notice: Subject to any disclaimer, the term of this patent is extended or adjusted under 35 U.S.C. 154(b) by 27 days.

(21) Appl. No.: 15/210,898

(22) Filed: Jul. 15, 2016

(65) Prior Publication Data
US 2016/0319481 A1 Nov. 3, 2016

(51) Int. Cl.
*D06M 15/277* (2006.01)
*D06M 15/564* (2006.01)
*B05D 1/28* (2006.01)
*B05D 1/02* (2006.01)
*C09D 5/00* (2006.01)
*C09D 5/16* (2006.01)

(52) U.S. Cl.
CPC ............. *D06M 15/277* (2013.01); *B05D 1/02* (2013.01); *B05D 1/28* (2013.01); *C09D 5/00* (2013.01); *D06M 15/564* (2013.01); *C09D 5/1662* (2013.01)

(58) Field of Classification Search
None
See application file for complete search history.

(56) References Cited

U.S. PATENT DOCUMENTS

| | | | |
|---|---|---|---|
| 2010/0092689 A1* | 4/2010 | Chen ................... | D06M 15/564 427/513 |
| 2010/0120309 A1* | 5/2010 | Arnold ................ | D06M 15/256 442/67 |
| 2012/0037835 A1* | 2/2012 | Otozawa ............... | C08F 220/24 252/8.57 |

\* cited by examiner

*Primary Examiner* — Erma C Cameron

(57) ABSTRACT

A rain-test resistant, high-vapor-permeable, water-repellent and water-resistant manufacturing process for making such fabrics is provided. It is used in the dyeing and finishing process of fabric in which the fabric is treated with the treatment roller, knife roller, and spray methods. These combined methods can coat water-repellent agent on the fabric and form a very thin film on the fabric. This protective film on the fabric enhances the wash resistance of the fabric while it will not adversely affect the water repellence and water resistance of the fabric. Moreover, this technique of forming a very thin water-repellent film on the fabric rules out the conventional method with which the water-repellent agent dipped within the fabric structure is easily washed out with regular laundry of the fabric due to the lesser amount of the agent being attached onto the fabric.

1 Claim, 6 Drawing Sheets

| fabric | test items | ISO811 (mmH₂O) water column | AATCC 135 water cycle | | pass rain test AATCC 35 (<1.00g passing) | Bundesmann Test ISO9865 | | | |
|---|---|---|---|---|---|---|---|---|---|
| | | | HL0 | HL100 | | water repellency | | water leaking (ml) | water absorbency (%) |
| | | | | | | 1min | 5min | | |
| embodiment 1 | 70Dx70D | 600 | 100 | 100 | 0.07 | 100 | 100 | 0 | 3 |
| embodiment 2 | 40Dx40D | 600 | 100 | 100 | 0.03 | 100 | 100 | 0 | 5 |
| comparison 1 | 70Dx70D | 0 | 100 | 60 | 6.5 | 70 | 70 | 19.6 | 26 |
| comparison 2 | 40Dx40D | 0 | 100 | 70 | 9.4 | 70 | 70 | 15 | 30 |

Figure 10

PROCESS OF MANUFACTURING RAIN WATERPROOF BREATHABLE FABRIC

BACKGROUND OF THE INVENTION

1. Field of the Invention

This invention is related to a manufacturing method of fabric with rain-test resistance, high vapor permeability, water repellence, and water resistance. Particularly in the dyeing and finishing processes, the rain test resistance, high vapor permeability, water repellence, and water resistance of fabrics adhered with water-repellent agent can be achieved with treatment roller method, knife roller coating, and spray method.

2. Description of Related Art

It is a common practice to coat polyurethane or acrylic resin on fabric for enhancing the fabric's water resistance property. However, improper pretreatment of fabric will result in insufficient water repellence, as denoted in FIG. 1, the commonly used water repellent manufacturing process will make uneven distribution on fabric F at thickness L, and the water repellent agent will penetrate into the fabric F.

The following phenomena are commonly observed in the conventional process:

(a) Sizing agent is used when the weft yarn is passing through the warp yarn to avoid yarn breaks. If the sizing agent is not completely removed, water repellent agent will not be added-on.

(b) Fabric's water content may also cause problems. For example, nylon's water content 1.5% and polyester 0.4% both will hinder water repellent agent from entering into the fabric's structure.

(c) The continuous production process uses the pressure roller to control the pick-up weight. If the pressure is too high or uneven, the pick-up weight will be reduced and ineffective.

(d) Due to the insufficient pick-up weight, the treated fabrics will gradually lose its water repellence after the AATCC wash cycles.

(e) Poor color fastness of the fabric will slowly lead to poor water repellence as colorant is being washed away.

Thus, the need for improvement still exists.

SUMMARY OF THE INVENTION

It is therefore one object of the invention to provide a process of manufacturing a rain-test resistant, high vapor permeable, water repellent and water resistant fabric. The dyed fabric is being treated with water-repellent agent using the finishing method: a very thin film will form on the fabric to endow the fabric with the above properties. The thin film is formed by the treatment roller, knife coater or the spray method on the fabric. The water repellent agent is a mixture composed of the following reagents: 10-20 wt % of fluoro-containing acrylic resin, 5-8 wt % of aqueous polyurethane resin, 3-4 wt % of lemon acid, 0.2-0.45 wt % of leveling agent, 5-8 wt % of aqueous isocyanate crosslinker, 0.1-0.5 wt % of polyacrylic acid thickener, and 80-90 wt % of soft water. The combined water repellent agent is then adhered to the fabric to form a very thin film by the above mentioned method. This invention possesses the following unique properties:

This invention can avoid the uneven dispersion of water repellent agent on the fabric, the water repellent agent is evenly adhered onto the fabric by this method and saves more energy by doing so.

This invention reveals that the water repellent agent is more strongly bonded to the fabric by the added crosslinker. The fabric can withstand 100 wash cycles without losing its water repellency, while the fabric treated with previous technique can only resist 20 wash cycles at the most.

The technique used in this invention forms a very thin water-repellent-agent film, thus the treated fabric shows very good water repellency and water resistance.

The very thin water-repellent-agent film formed on the fabric possesses good water repellency and water resistance. This technique is different from previous water-resistant polyurethane treatment, polyurethane resin can promote water resistance of the fabric but it also makes the body feel uncomfortable. This invention, however, will not affect the fabric's vapor permeability due to a very thin vapor-permeable film is formed.

The manufacturing process developed in this invention forms a very thin water-repellent film on the fabric surface, the water repellent agent will also fill up the gap between the fabric's fibers. This leads to better anti-siphon property of the fabric which eventually endows the fabric with rain resistance and water resistance.

The above and other objects, features and advantages of the invention will become apparent from the following detailed description taken with the accompanying drawings.

BRIEF DESCRIPTION OF THE DRAWINGS

FIG. 10 is a table showing test results of the water repellent agent treated fabric.

DETAILED DESCRIPTION OF THE INVENTION

Figure 1:
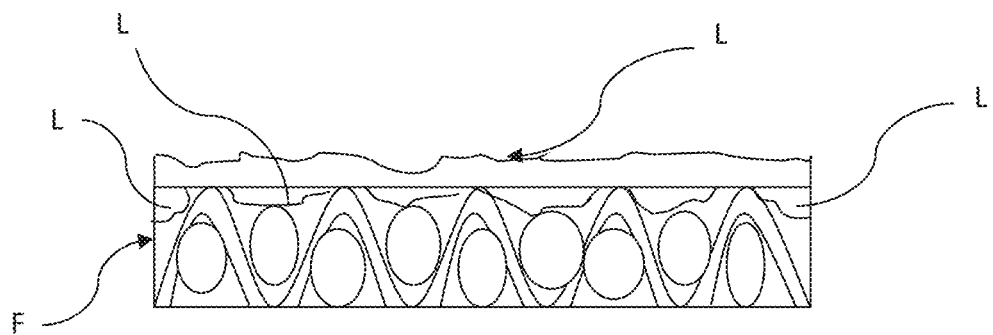
FIG. 1 is a profile figure of the conventional water repellent treated fabric.
Figure 2:
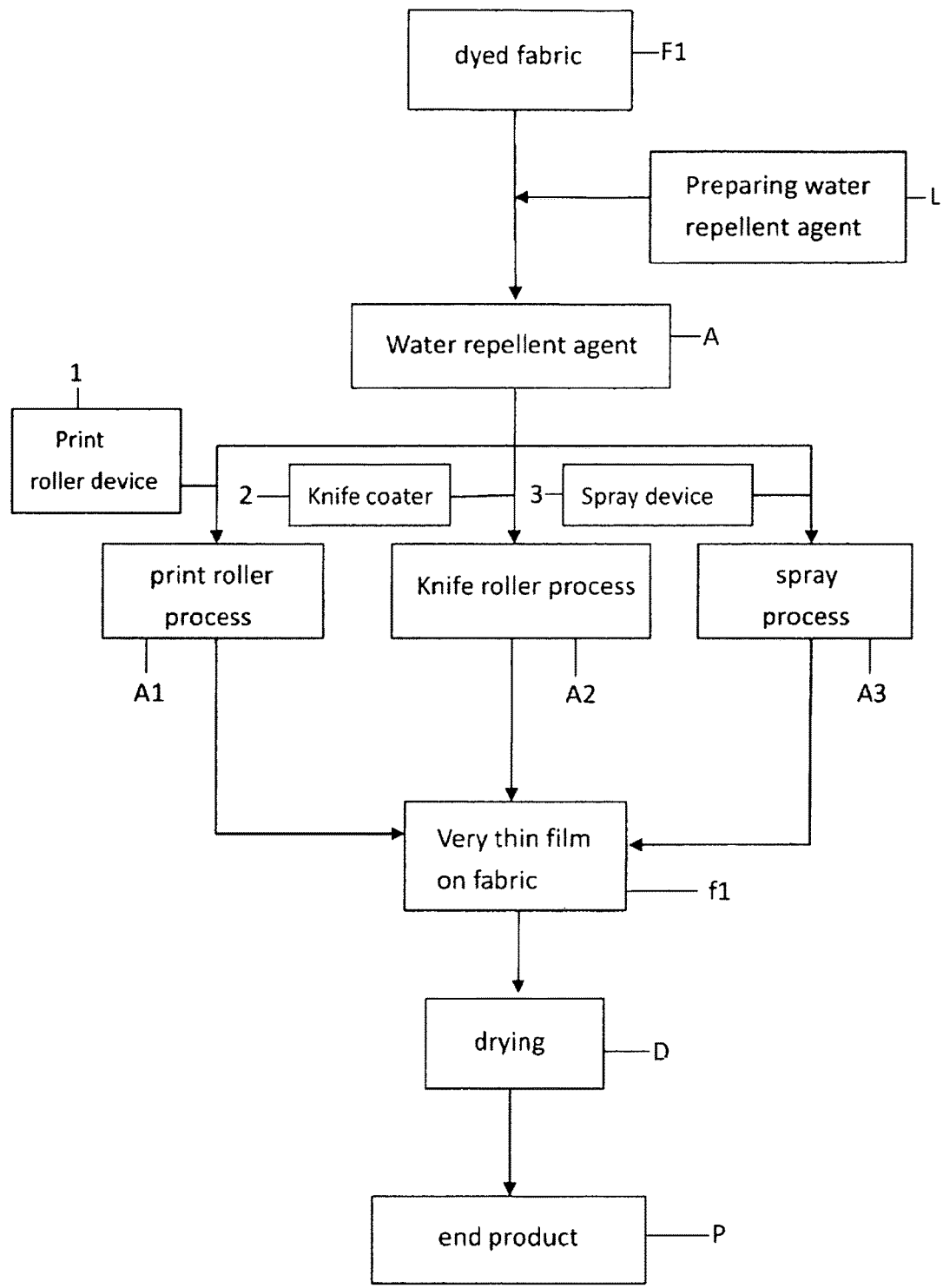
FIG. 2 is a rain-resistant, high-vapor-permeable and water-repellent-agent manufacturing process, illustrated by this invention.
Figure 3:
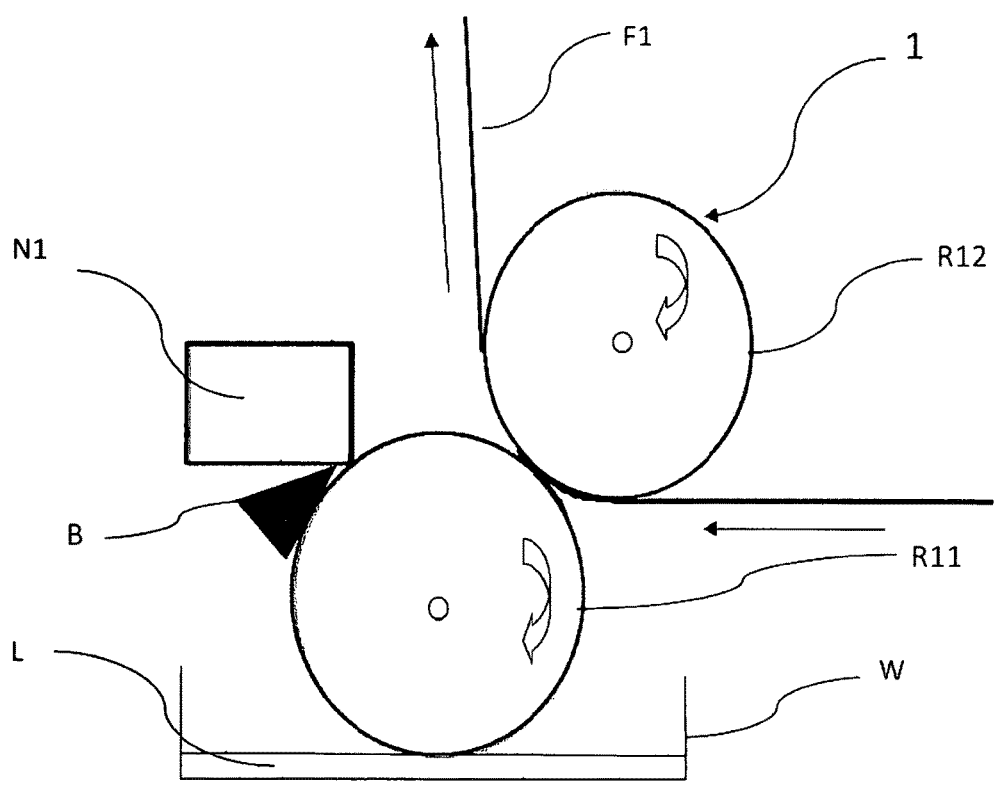
FIG. 3 is a rain-resistant, high-vapor-permeable and water-repellent-agent manufacturing process, illustrated by this invention, this figure denotes the treatment roller's coverage ratio.
Figure 4:
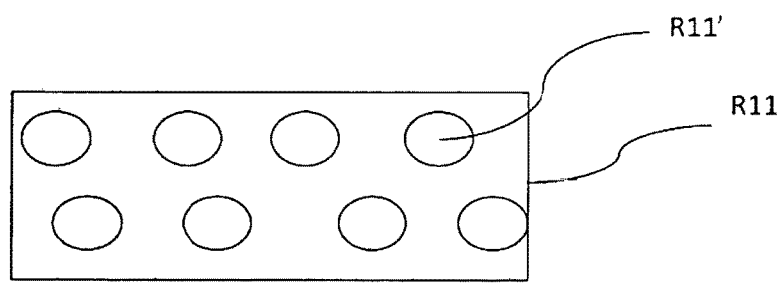
FIG. 4 is part A of FIG. 3, treatment roller with bigger and deeper concave surface.
Figure 5:
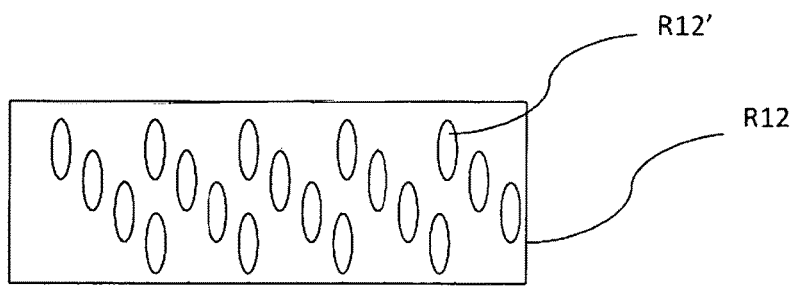
FIG. 5 is part B of FIG. 3, treatment roller with smaller and shallow concave surface.
Figure 6:
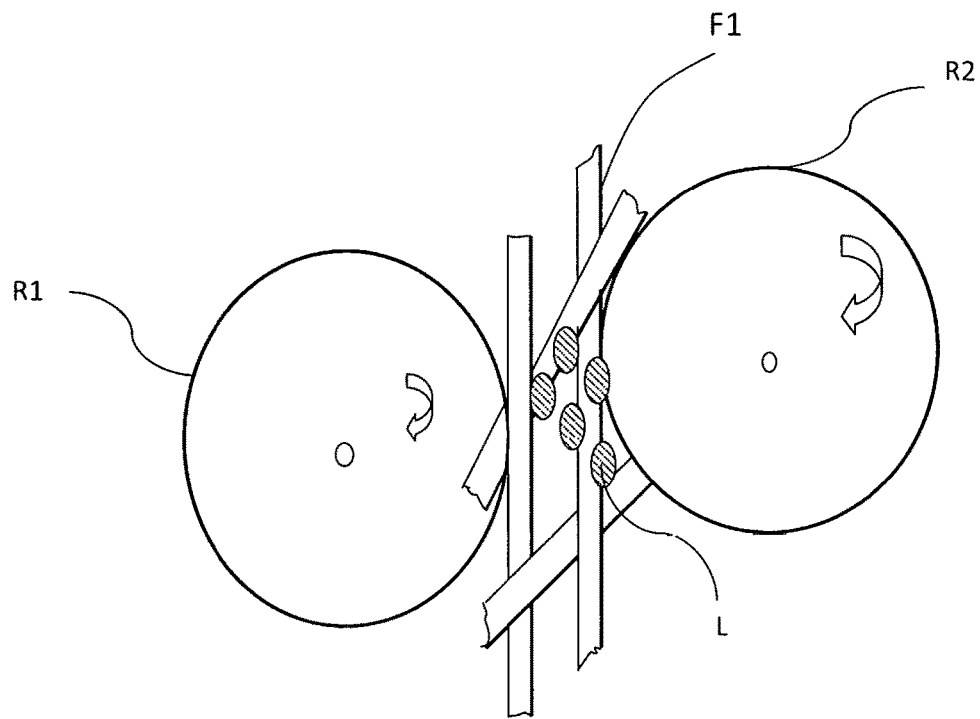
FIG. 6 is a three-dimensional figure illustrating treatment roller process for the water-repellent treated fabric by this invention.
Figure 7:
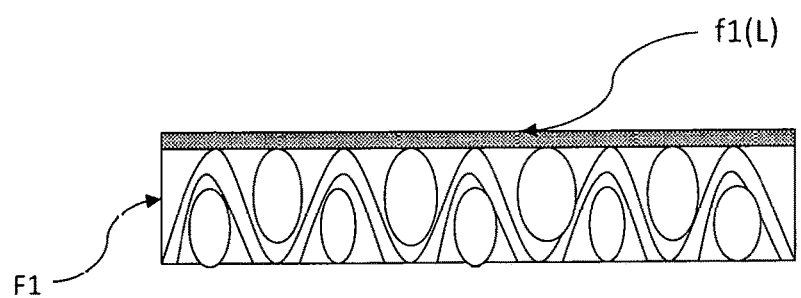
FIG. 7 is a rain-resistant, high-vapor-permeable and water-repellent manufacturing process by this invention forming a water-repellent film on fabric, illustrated by fabric's profile figure.

Referring to FIGS. 2 to 10, this invention reveals a method of manufacturing fabric with improved rain resistance, high vapor permeability, and high water repellence. The key steps involve the dyed fabric F1 (see FIG. 2) passing through water repellent agent A, the fabric F1 is then treated with treatment roller, knife coater, or spray method, a very thin water-repellent film f1 is formed on the fabric F1, which is dried (D) to obtain product P, as depicted in FIG. 2. FIG. 3 shows the treatment roller method: treatment roller facility 1, including the back treatment roller R1, pressure roller R2, coating knife N1, batching plate B, fabric F1 between roller R1 and R2, and water repellent agent L in tank W. The roller R1 brings up water repellent agent L which is coated by knife coater N1. Thus the agent L is coated onto the fabric F1 with the concave treatment rollers R11 and R12. These coatings include: (A) the deep concave surface R11' of roller R11 which is bigger as depicted in FIG. 4; and (B) the shallow concave surface R12' of roller R12 which is smaller as depicted in FIG. 5. FIGS. 3-5 show: a. preparing the water repellent agent L; b. two rollers R11 and R12 with different concave sizes; c. the knife coater N1 equipped on the back treatment roller R1 and the residual agent L rolled back to the tank W to be reused; d. the pressure roller R2 transferred the water repellent agent L on the roller R11 or R12 to the fabric F1 and followed by heat treated. As shown in FIG. 6, the water repellent agent L is transferred to the fabric F1 between back treatment roller R1 and pressure roller R2, the agent L will form a very thin film f1 on the fabric F1 surface, as shown in FIG. 7.

Figure 8:
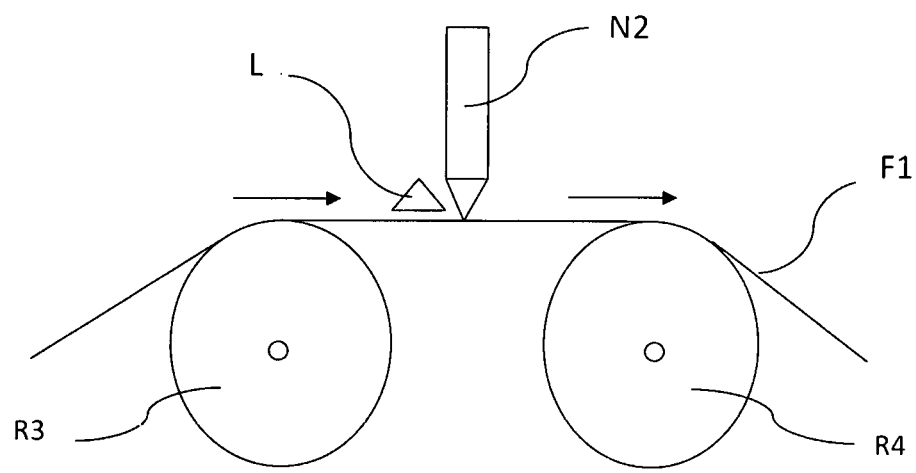
FIG. 8 is a rain-resistant, high-vapor-permeable and water-repellent-agent manufacturing method: knife roller technique, as illustrated by this invention.
Figure 9:
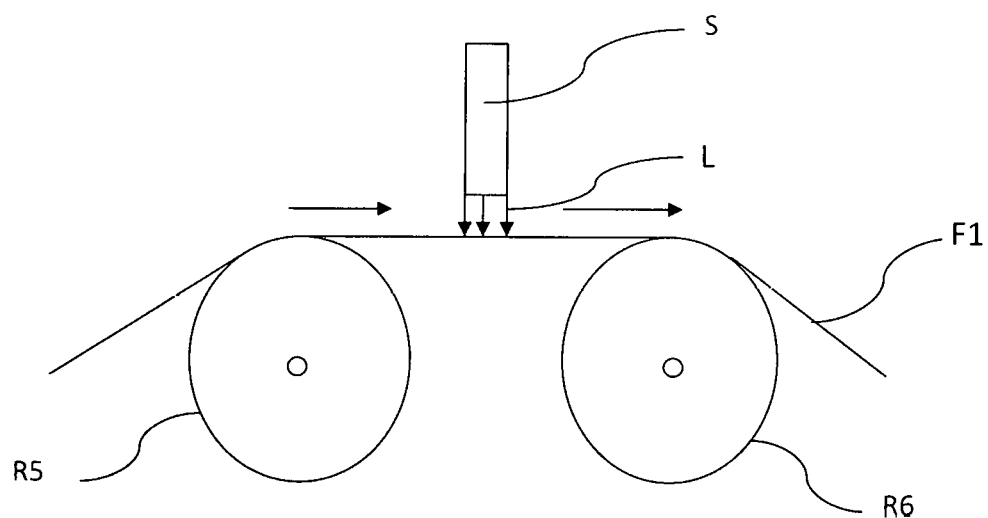
FIG. 9 is a rain-resistant, high-vapor-permeable and water-repellent-agent manufacturing method: spray technique, as illustrated by this invention.

Moreover, the knife coating method as shown in FIG. 8 reveals: as the two rollers R3 and R4 with the knife coater N2 spinning, the fabric F1 passing through rollers R3 and R4. The knife coater N2 coats the water repellent agent L onto the fabric F1. FIG. 9 shows the spray head method. The spray method facility is composed of two rollers R5 and R6 and a spray head S, and the fabric F1 passing through rollers R5 and R6. The spray head S sprays the water repellent agent L onto the fabric F1.

As shown in Table 1, we can select the thickener type to adjust the weight amount of water repellent agent used and the thickness of the coated film on the fabric. The adjustable formulation of the water repellent agent can be varied to suit for all types of fabric structures.

TABLE 1

Water repellent agent formulations

| Items | Component | Ratio added |
|---|---|---|
| Resin a | Fluoro-containing acrylic resin | 10-20 wt % |
| Resin b | Aqueous polyurethane | 2-4 wt % |
| Crosslinker | Isocyanate | 2-4 wt % |
| Thickener | Polyacrylic acid | 0.1-0.5 wt % |
| pH regulator | Lemon acid | 0.1-0.2 wt % |
| Soft water | — | 80-90 wt % |

Example 1

Nylon fabric is coated with a water repellent mixture using the knife-roller technique, the mixture has the following formulation: fluoro-containing acrylic resin×20 wt %; aqueous polyurethane resin×6 wt %; isocyanate-containing curing agent×5 wt %; acrylic thickener×0.2%; lemon acid-containing pH regulator×90 wt %. The coating weight is below 10 g/m2 and the coated fabric is dried at 150° C.×1 minute. The finished fabric is washed 100 times according to the AATCC135 method and the water repellency shows a value of 100 according to the AATCC22 test method. The AATCC35 rain test of the coated fabric is 0.07 gram. The Bundesmann test ISO 9865 of the coated shows a value of 100, the water leaking 0 ml and water absorbance 3%, as the results shown in FIG. 10.

Example 2

Nylon fabric (40D×40D) is coated with a water repellent mixture using the knife-roller technique, the mixture has the following formulation: fluoro-containing acrylic resin×15 wt %; aqueous polyurethane resin×3.5 wt %; isocyanate-containing curing agent×2.5 wt %; acrylic thickener×0.15%; polydimethysiloxane-containing leveling agent×0.2%; lemon acid-containing pH regulator×85%. The coating weight on the fabric is below 10 g/m2 and the coated fabric is processed at 150° C.×1 minute. The finished fabric is washed 100 times according to the AATCC135 method and the water repellency shows a value of 100 according to the AATCC22 test method. The AATCC35 rain test of the coated fabric is 0.03 gram. The Bundesmann test ISO 9865 of the coated shows a water repellency value of 100 with the water leaking 0 ml and the water absorbance ratio of 5%, as shown in FIG. 10.

Comparative Example 1

Nylon fabric (70×70D) is dipped with a water repellent mixture in a solution container, the dipping mixture has the following formulation: fluoro-containing acrylic resin×10 wt %; isocyanate-containing curing agent×1.5 wt %; and soft water content of 90 wt %. The added-on weight on the fabric is below 10 g/m2 and the dipped fabric is dried at 150° C.×1 minute. The dipped fabric is then subjected to the AATCC135 wash for 100 times and the water repellence has a value of 60 according to the AATCC22 test method. The AATCC35 rain test of the dipped fabric shows a value of 6.5 grams. The Bundesmann test ISO 9865 of the dipped fabric shows the water repellence of 70 with a water leak of 19.6 ml and the water absorbance of 26%, as shown in FIG. 10.

Comparative Example 2

Nylon fabric of different denier (40×40D) is dipped with a water repellent mixture in a solution container, the dipping mixture has the same formulation as the above example: fluoro-containing acrylic resin×10 wt %; isocyanate-containing curing agent×1.5 wt %; and soft water content of 90 wt %. The added-on weight on the fabric is below 10 g/m2 and the dipped fabric is dried at 150° C.×1 minute. The dipped fabric is then subjected to the AATCC135 wash for 100 times and the water repellence has a value of 70 according to the AATCC22 test method. The AATCC35 rain test of the dipped fabric shows a value of 9.4 grams. The Bundesmann test ISO 9865 of the dipped fabric shows the water repellence of 70 with a water leak of 15 ml and the water absorbance of 30%, as shown in FIG. 10. Here we can see the difference between the two nylon fabric of different deniers.

FIG. 10 lists test results of experiments 1, 2 and comparative experiments 1, 2. Test samples washed by AATCC135 100 method showed that experiments 1 and 2 both exhibited water repellency of 100 using the AATCC22 test method, while comparative experiments exhibited water repellency of 60 and 70, individually. AATCC rain tests for experiments 1 and 2 are 0.07 g and 0.03 g, while the values for comparative experiments 1 and 2 are 6.5 g and 9.4 g individually.

Simulating rain condition and using the more stringent Bundesmann ISO 9685 rain-simulating test, the test species are subjected to the rain test for a continuous 5 minutes. Experimental samples 1 and 2 shows the water repellency of 90-100 with the water leak of zero, while for comparison experimental samples are individually 19.6 ml and 15 ml. Thus, FIG. 10 displays no water leak for experimental samples 1 and 2 while the water absorbance for experimental samples are 3% and 5%. The corresponding values for comparison experimental samples are 26% and 30%. These distinctive figures apparently denote that the physical properties of the experimental samples are better than those of the comparison experimental samples.

While the invention has been described in terms of preferred embodiments, those skilled in the art will recognize that the invention can be practiced with modifications within the spirit and scope of the appended claims.

What is claimed is:

1. A fabric manufacturing process comprising the steps of:
   (1) preparing a water-repellent solution including fluoro-containing acrylic resin, aqueous polyurethane dispersion, lemon acid, leveling agent, isocyanate curing agent, and thickener;
   (2) applying the water-repellent solution onto a fabric using a treatment roller method, a knife roller method, or a spray method; and
   (3) applying the water-repellent solution onto the fabric to form a film on the fabric, thereby manufacturing a rain-resistant, vapor-permeable, and water-repellent fabric;
   wherein in step (3) weight of the water-repellent solution applied onto the fabric is less than 10 $g/m^2$.

* * * * *